United States Patent
Xu et al.

(10) Patent No.: US 10,122,174 B2
(45) Date of Patent: Nov. 6, 2018

(54) PARALLELIZATION METHOD FOR BLACK-START SUBSYSTEMS OF POWER GRID WITH EXTERNAL SUPPORT

(71) Applicants: STATE GRID CORPORATION OF CHINA, Beijing (CN); ECONOMIC & TECHNOLOGY RESEARCH INSTITUTE OF HUBEI ELECTRIC POWER COMPANY, Wuhan, Hubei (CN); CENTRAL CHINA GRID COMPANY LIMITED, Wuhan, Hubei (CN)

(72) Inventors: Jingyou Xu, Hubei (CN); Qing Chang, Beijing (CN); Chunming Wang, Hubei (CN); Hanping Xu, Hubei (CN); Youping Xu, Hubei (CN); Jisheng Li, Hubei (CN); Dawei Huang, Hubei (CN); Xiuwen Xiong, Hubei (CN)

(73) Assignees: STATE GRID CORPORATION OF CHINA, Beijing (CN); ECONOMIC & TECHNOLOGY RESEARCH INSTITUTE OF HUBEI ELECTRIC POWER COMPANY, Wuhan, Hubei (CN); CENTRAL CHINA GRID COMPANY LIMITED, Wuhan, Hubei (CN)

( * ) Notice: Subject to any disclaimer, the term of this patent is extended or adjusted under 35 U.S.C. 154(b) by 267 days.

(21) Appl. No.: 15/151,052

(22) Filed: May 10, 2016

(65) Prior Publication Data
US 2016/0254670 A1    Sep. 1, 2016

Related U.S. Application Data

(63) Continuation of application No. PCT/CN2014/086686, filed on Sep. 17, 2014.

(30) Foreign Application Priority Data

Dec. 27, 2013  (CN) .......................... 2013 1 0734525

(51) Int. Cl.
H02J 3/38 (2006.01)
G05B 17/02 (2006.01)
H02J 3/00 (2006.01)

(52) U.S. Cl.
CPC ................ *H02J 3/38* (2013.01); *G05B 17/02* (2013.01); *H02J 2003/007* (2013.01); *Y02E 60/76* (2013.01); *Y04S 40/22* (2013.01)

(58) Field of Classification Search
CPC ...... G05B 17/02; H02J 2003/007; H02J 3/38; Y02E 60/76; Y04S 40/22
See application file for complete search history.

(56) References Cited

U.S. PATENT DOCUMENTS

| 2003/0015873 A1* | 1/2003 | Khalizadeh | ............... H02P 9/04 290/7 |
| 2004/0009380 A1* | 1/2004 | Pearson | ............ H01M 8/04089 429/431 |

(Continued)

FOREIGN PATENT DOCUMENTS

| CN | 102035256 A | 4/2011 |
| CN | 102904251 A | 1/2013 |

(Continued)

OTHER PUBLICATIONS

International Search Report issued by the State Intellectual Property Office of the Peoples Republic of China dated Dec. 26, 2014 for PCT/CN2014/086686.

*Primary Examiner* — Kenneth M Lo
*Assistant Examiner* — Michael J Huntley
(74) *Attorney, Agent, or Firm* — Locke Lord LLP; Tim Tingkang Xia, Esq.

(57) ABSTRACT

The invention relates to a parallelization method for black-start subsystems of a power grid with external support, which includes, after power blackout, partitioning the power grid into subsystems, and respectively performing black-start on the subsystems based on a power grid black-start research scheme, performing stability check on each subsystem, performing voltage calculation on parallel lines (Continued)

between the subsystems, checking the parallelizing simulation of the subsystems, and determining a feasible parallelizing path and a recommendable charging direction. The method further includes, starting from the subsystems having external support and higher stability, networking them with an external power grid, parallelizing the networked subsystems having external support to obtain a subnet of the subsystems, parallelizing subsystems having no external support with the subnet of the subsystems to obtain a regional subnet, and finally parallelizing the remaining subsystems with the regional subnet to implement parallelization of black-start subsystems of the whole power grid.

2 Claims, 2 Drawing Sheets

(56) References Cited

U.S. PATENT DOCUMENTS

| | | | | |
|---|---|---|---|---|
| 2004/0180243 | A1* | 9/2004 | Pearson | H01M 8/04089 |
| | | | | 429/430 |
| 2007/0239373 | A1* | 10/2007 | Nasle | G06F 17/5009 |
| | | | | 702/58 |
| 2009/0279328 | A1* | 11/2009 | Jiang-Hafner | H02J 3/36 |
| | | | | 363/35 |
| 2010/0332211 | A1* | 12/2010 | Oudalov | G05B 17/02 |
| | | | | 703/23 |
| 2012/0029897 | A1* | 2/2012 | Cherian | H02J 3/00 |
| | | | | 703/18 |
| 2013/0221877 | A1* | 8/2013 | Marken | H02P 1/46 |
| | | | | 318/139 |
| 2013/0346057 | A1* | 12/2013 | Lin | H02J 3/00 |
| | | | | 703/18 |
| 2015/0035366 | A1* | 2/2015 | Benesch | H02J 3/42 |
| | | | | 307/52 |
| 2016/0139212 | A1* | 5/2016 | Lin | G01R 31/40 |
| | | | | 702/108 |

FOREIGN PATENT DOCUMENTS

| | | |
|---|---|---|
| CN | 103036227 A | 4/2013 |
| CN | 103647304 A | 3/2014 |

* cited by examiner

PARALLELIZATION METHOD FOR BLACK-START SUBSYSTEMS OF POWER GRID WITH EXTERNAL SUPPORT

CROSS-REFERENCE TO RELATED APPLICATIONS

This application is a continuation application of International Patent Application No. PCT/CN2014/086686, filed Sep. 17, 2014, entitled "METHOD FOR PARALLELING POWER GRID BLACK-START SUBSYSTEM HAVING EXTERNAL SUPPORT," by Jingyou Xu et al., which itself claims the priority to Chinese Patent Application No. 201310734525.3, filed Dec. 27, 2013, in the State Intellectual Property Office of P.R. China, entitled "METHOD FOR PARALLELING POWER GRID BLACK-START SUBSYSTEM HAVING EXTERNAL SUPPORT," by Jingyou Xu et al., which are hereby incorporated herein in their entireties by reference.

FIELD OF THE INVENTION

The present invention relates generally to operation and dispatching control of a power grid, and more particular, to a parallelization method for black-start subsystems of a power grid with an external support.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art.

When a power grid has a large scale blackout accident or the power grid collapses, if the power grid is restored too slowly or collapses again, the blackout time of users is prolonged and the social impact is expanded, thereby bringing great loss to national economy and people's daily life, and even affecting social stability. Therefore, researches related to power grid black-start have drawn greatly attention domestically and abroad. Current researches on power grid black-start mainly focus on three aspects including a black-start research scheme, a black-start test scheme, and a black-start dispatching operation scheme. The black-start research scheme attacts more attention than the other two, which includes subsystem partitions, black-start power source and black-start path selections, self-excitation, overvoltage calculations, and optimized selections of different black-start research schemes based on certain optimization algorithms. In addition, researches also include relay protections and automatic safety devices during the black-start in a secondary system.

In the current power grid black-start research scheme, subsystems are divided, firstly, then related electrical calculations are conducted from the black-start power source along the black-start paths, so as to start another power source and a transformer, and restore corresponding load, thereby gradually restoring operation of the subsystem. Each subsystem can conduct black-start by using an internal black-start power source or an external black-start power source. Parallelization between the started subsystems is not focused by the current black-start research scheme. Therefore, the power grid black-start research scheme is actually a black-start research scheme of each subsystem of the power grid.

The present invention provides a parallelization method that is different from the above researches. The parallelization method is neither a black-start research scheme of a certain subsystem, nor a black-start test scheme or dispatching operation scheme. Instead, the parallelization method for the black-start subsystems of a power grid implements parallelization of the subsystems at certain determined voltage levels. The parallelization method for the black-start subsystems when the power grid has an external black-start power source support is greatly different from that when the power grid does not have an external black-start power source support. The present invention provides a parallelization method for black-start subsystems of a power grid with external support.

Therefore, a heretofore unaddressed need exists in the art to address the aforementioned deficiencies and inadequacies.

SUMMARY OF THE INVENTION

In one aspect of the invention, on the basis of the black-start research scheme, the method provides a parallelization method for black-start subsystems of a power grid with external support, which implements parallelization of subsystems at certain determined voltage levels. Among other things, the method determines available parallel paths between subsystems, and clarifies unavailable subsystem parallelization paths during the black-start, thereby avoiding risks of the black-start, improving the success rate of the black-start, and effectively restoring the main network structure of the power grid.

In certain embodiments, the parallelization method for black-start subsystems of a power grid with external support includes the following steps:

(A) after the power grid blackout, partitioning the power grid into subsystems, and respectively performing black-start on the subsystems, according to a black-start research scheme;

(B) performing stability check on each subsystem having restoration to more than 30% of a normal load by using power system simulation software, so as to obtain a stable level of each subsystem;

(C) continuously restoring load for an unstable subsystem, and performing stability check once when every 5% of normal load is increased, so as to obtain stable levels of the subsystems, until the subsystems are all stable;

(D) performing voltage calculation on parallel lines between the subsystems by using power system simulation software, primarily determining unavailable parallel paths so as to obtain primary available parallel paths, and selecting a charging direction having a lower terminal charging voltage as a charging direction;

(E) performing parallel simulation check on the primary available parallel paths obtained in step (D) by using power system simulation software, and further determining unavailable parallel paths so as to obtain available parallel paths; and (F) parallelizing black-start subsystems of the power grid with external support according to the following sequence:

(F1) networking a subsystem having an external support and a relatively high stability level with an external power grid;

(F2) networking a subsystem having an external support and a relatively low stability level with the external power grid;

(F3) parallelizing the networked subsystems having external support, so as to obtain a subnet of the subsystems having external support;

(F4) parallelizing a subsystem having no external support and a relatively high stability level with the subnet of the subsystems having external support, so as to obtain a regional subnet;

(F5) parallelizing a subsystem having no external support and having a relatively low stability level with the regional subnet, so as to obtain a large regional subnet;

(F6) parallelizing the remaining subsystems with the large regional subnet, so as to implement parallelization of black-start subsystems of the whole power grid; and (F7) in each of the above networking and parallelizing steps, if there exist multiple available paths between two subsystems, perform the corresponding step according to a sequence of overvoltage levels from low to high.

Compared with the prior art, the parallelization method according to the present invention has at least following advantages:

1. The current power grid black-start research scheme is a basis of parallelization for black-start subsystems of a power grid, and the present invention provides a parallelization method between black-start subsystems of a power grid is advantageous for a power grid dispatching operator to implement quick restore of a power grid of a larger region.

2. The parallelization method for black-start subsystems of a power grid provided in the present invention combines power grid characteristic analysis and calculation check, so as to solve the defect of insufficient calculation check in the conventional black-start research scheme caused by overdependence on qualitative analysis of system operation characteristic and daily operation experience.

3. The improvement of the parallelization method for black-start subsystems of a power grid provided in the present invention compared with the conventional black-start research scheme lies in that it not only provides available parallel paths between the subsystems, but also indicates a specific charging direction during the parallelization, and can also clarify unavailable subsystem parallel paths during the black-start, thereby avoiding risks of the black-start and improving the success rate of the black-start.

4. The present invention provides a basic method and a backup scheme for the power grid dispatching operation agency to effectively restore the main network structure of the power grid, is of great benefit to promoting the large power grid black-start process and restoring power use requirements of a larger range, thereby having an important social benefit.

These and other aspects of the present invention will become apparent from the following description of the preferred embodiment taken in conjunction with the following drawings, although variations and modifications therein is affected without departing from the spirit and scope of the novel concepts of the present invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

The present invention will now be described more fully hereinafter with reference to the accompanying drawings, in which exemplary embodiments of the present invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

The terms used in this specification generally have their ordinary meanings in the art, within the context of the present invention, and in the specific context where each term is used. Certain terms that are used to describe the present invention are discussed below, or elsewhere in the specification, to provide additional guidance to the practitioner regarding the description of the present invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the present invention or of any exemplified term. Likewise, the present invention is not limited to various embodiments given in this specification.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions and/or sections, these elements, components, regions and/or sections should not be limited by these terms. These terms are only used to distinguish one element, component, region or section from another element, component, region or section. Thus, a first element, component, region or section discussed below can be termed a second element, component, region or section without departing from the teachings of the present invention.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the terms "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

The description below is merely illustrative in nature and is in no way intended to limit the present invention, its application, or uses. The broad teachings of the present invention can be implemented in a variety of forms. Therefore, while this disclosure includes particular examples, the true scope of the present invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the present invention.

Figure 1:
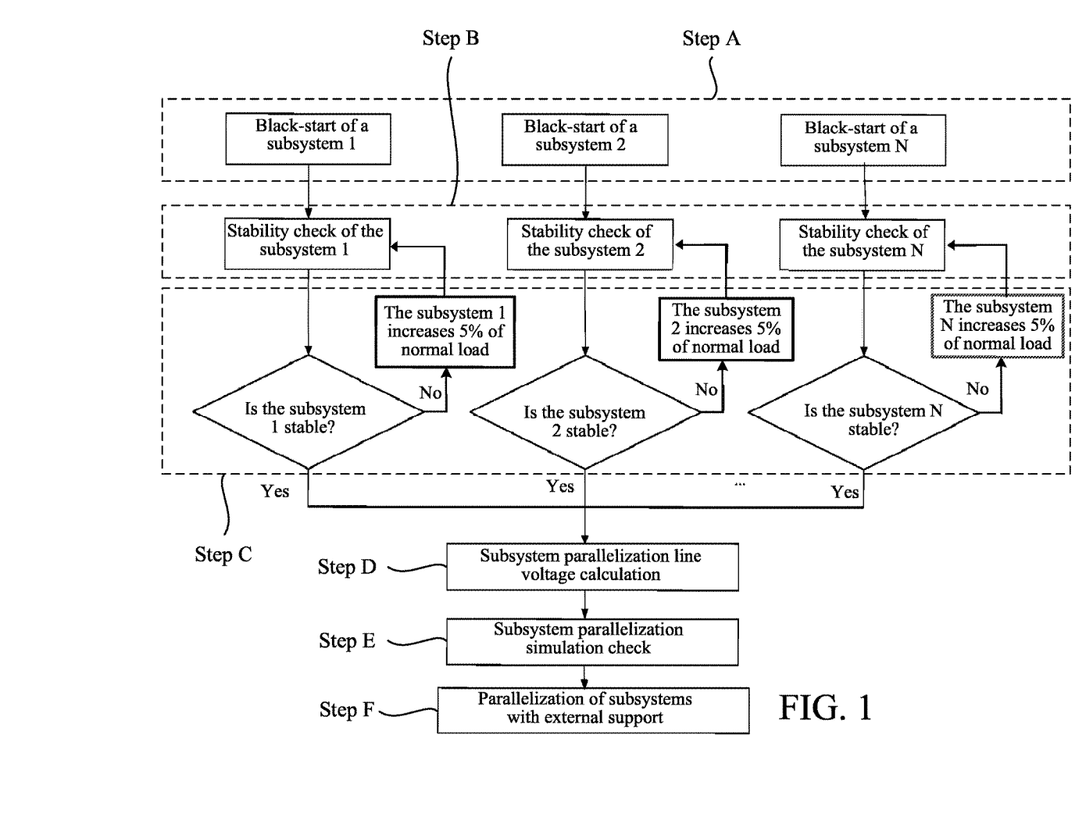
FIG. 1 is a schematic flow chart of a parallelization method according to one embodiment of the present invention.
Figure 2:
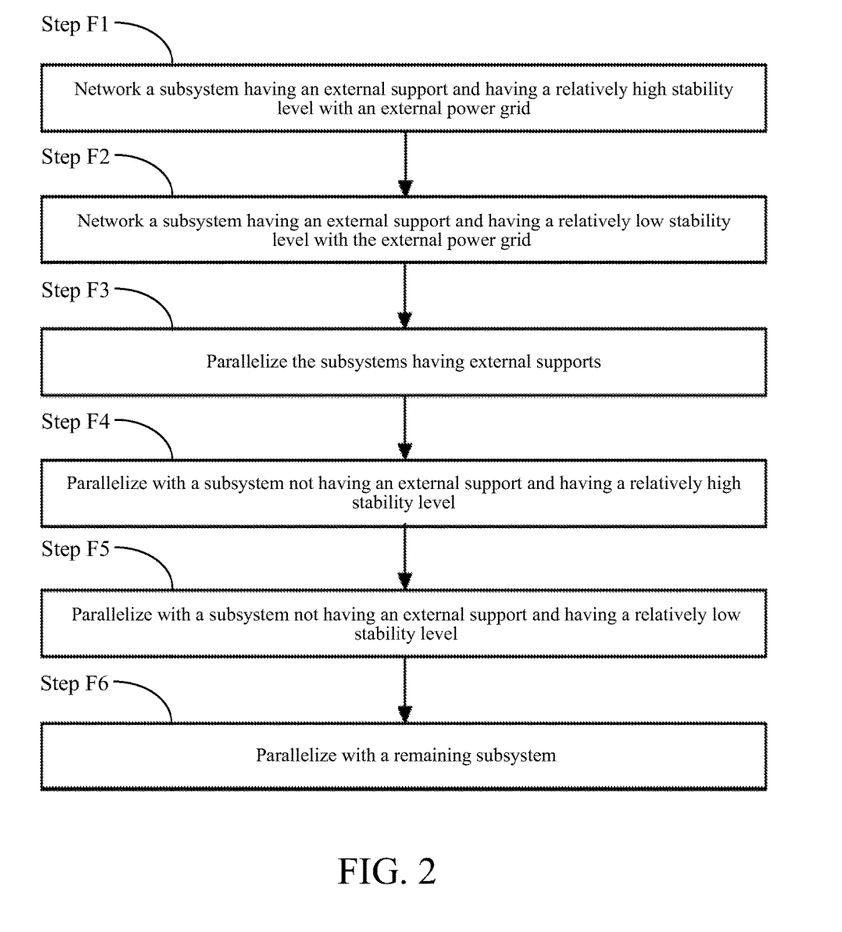
FIG. 2 is a schematic flow chart of a parallelization method of subsystems having external support according to one embodiment of the present invention.

Referring to FIGS. 1 and 2, and particularly to FIG. 1, the parallelization method for black-start subsystems of a power grid with external support includes the following steps:

Step A: After the power grid blackout, partitioning the power grid into subsystems, and respectively performing black-start on the subsystems, according to a black-start research scheme.

The current power grid black-start research scheme is actually a black-start research scheme of each subsystem of the power grid. The power grid black-start research scheme partitions (divides) the power grid into N black-start subsystems, and black-start research schemes of a subsystem 1, a subsystem 2, . . . , and a subsystem N are investigated in detail, as shown in FIG. 1, so as to clarify an external black-start power source and an inner black-start power source of the subsystem, a black-start path, a power source and load restoring order and quantity, a contact line and synchronous parallelization point between subsystems at a certain voltage level. The subsystem 1, the subsystem 2, . . . , and the subsystem N performs black-start independently, to establish respective target network structures, that is, a basic power grid of each subsystem established by gradually starting another power source, a restoring line, a transformer substation and a load along the black-start path by the respective black-start power source.

Step B: Performing stability check on each subsystem having restoration to more than 30% of a normal load by using power system simulation software, so as to obtain a stable level of each subsystem.

Based on started power resources, target network structures and load restoring situations of the subsystem 1, the subsystem 1, . . . , and the subsystem N, respectively establishing a subsystem operation manner for the load of the subsystem 1, the subsystem 2, . . . , and the subsystem N to restore to 30% of the normal load level, to serve as a parallelization initial state of the subsystem 1, the subsystem 2, . . . , and the subsystem N. The load restoring level of the subsystem parallelization initial state is 30% of the normal load of the subsystem, that is, the minimum load restoring level for the subsystem to keep enough stability level and anti-disturbance ability so as to implement subsystem parallelization reliably. In fact, different subsystems have different ranges, different load capacities and different power source types for restoring at the primary stage of black-start, and therefore, the load restoring levels of parallelization initial state for the subsystems may also be correspondingly different. For example, a subsystem having a small total local capacity and a large power grid range may have a relatively low load restoring level; for a subsystem having multiple small hydropower stations that are easily started, even the restored load level is low, the subsystem can still keep a high stability level and anti-disturbance ability; and for a subsystem in which started power units are mostly thermal power units especially thermal power units having large unit capacity, more load is required to be restored correspondingly. Therefore, the 30% of the normal load restoring level is a suggested value. For the subsystem 1, the subsystem 2, . . . , and the subsystem N, a stability level of the system when the subsystem fails is simulated and checked respectively by using power system simulation software, for example, a power system analysis software package PSASP, BPA, DSA or PSS/E, etc., which mainly simulates and checks the power angle stability, the voltage stability and the frequency stability of the system when failure-free breakdown and a single-phase permanent grounding short circuit failure of a line in a voltage level of 110 kV and more occur.

Step C: Continuously restoring load for an unstable subsystem, and performing stability check once when every 5% of the normal load is increased, so as to obtain stable levels of the subsystems, until the subsystems are all stable.

According to a simulation check result in step B, the stability levels of the subsystem 1, the subsystem 2, . . . , and the subsystem N are determined respectively. If the stability level of a subsystem is low, the parallelization initial state of the subsystem is adjusted, and the specific adjustment method is: further starting the power source, restoring the line and the load on the basis of the previous initial state, so as to use the subsystem operation state with more 5% normal load level being restored as a new parallelization initial state, and returning to step B to check the stability of the subsystem, until the subsystems are all stable.

Step D: Performing voltage calculation on parallel lines between the subsystems by using power system simulation software, primarily determining unavailable parallel paths so as to obtain primary available parallel paths, and selecting a charging direction having a lower terminal charging voltage as a charging direction.

The contact lines at a certain voltage level between the subsystems determined in step A are possible parallel lines between the subsystems, and for the parallel lines, line voltage capacitive rise effect when being charged from two sides is calculated respectively, and when a terminal charging voltage of a parallel line does not exceed 1.1 times of a rated voltage, the parallel line is an available parallel line, and a charging direction having a lower terminal charging voltage is selected as a recommended charging direction. If the terminal voltage exceeds 1.1 times of the rated voltage, a head end initial voltage may be reduced (but cannot be lower than 0.9 times of the rated voltage), thereby reducing the terminal charging voltage. After the initial voltage is reduced and available voltage control measures such as high resistance of the line are used, if the terminal voltage of the opposite side still exceeds 1.1 times of the rated voltage regardless of from which side of two sides of the line the charging is conducted to the opposite side, the line cannot be used as a parallel line to implement the parallelization of the subsystems.

Step E: Performing parallel simulation check on the primary available parallel paths obtained in step D by using power system simulation software, and further determining unavailable parallel paths so as to obtain available parallel paths.

According to various primary available parallel lines between the subsystems at a certain voltage level and charging directions thereof determined in step D, subsystem parallel transient simulation calculation is conducted respectively, so as to check the power fluctuation on the parallel line, unit relative power angles of parallelized subsystems, bus voltages of important transformers, and changes of the system frequency during the parallelization of the subsystems.

Step F: Parallelizing black-start subsystems of the power grid with external support according to the following sequence:

(F1) networking a subsystem having an external support and a relatively high stability level with an external power grid;

(F2) networking a subsystem having an external support and a relatively low stability level with the external power grid;

(F3) parallelizing the networked subsystems having external support, so as to obtain a subnet of the subsystems having external support;

(F4) parallelizing a subsystem having no external support and a relatively high stability level with the subnet of the subsystems having external support, so as to obtain a regional subnet;

(F5) parallelizing a subsystem having no external support and having a relatively low stability level with the regional subnet, so as to obtain a large regional subnet;

(F6) parallelizing the remaining subsystems with the large regional subnet, so as to implement parallelization of black-start subsystems of the whole power grid; and (F7) in each of the above networking and parallelizing steps, if there exist multiple available paths between two subsystems, performing the corresponding step according to a sequence of overvoltage levels from low to high.

When there is an external black-start power source support, the external power grid has a higher stability level and anti-disturbance ability than the power grid requiring the black-start, and power source support can be provided quickly. Therefore, the black-start power source from the external power grid has a better availability and usability, and networking of the subsystem with external support and the external power grid should be implemented preferentially. As shown in FIG. 2, the subsystem having external support and relatively high stability level is first networked with the external power grid, then, the subsystem having external support and relatively low stability level is networked with the external power grid; after the subsystems having external support are all networked with the external power grid, parallelization between the subsystems with external support is implemented, then parallelization with subsystems not having external support and having relatively high stability level is implemented, and then, parallelization with subsystems not having external support and having relatively low stability level is implemented, and finally parallelization with remaining subsystems is implemented, until all the subsystems implement the parallelization, to form an overall main network structure of the power grid.

Without intent to limit the scope of the invention, a specific embodiment of the method of the present invention is further described below in detail by using a provincial power grid in China as an example.

Step A: After the power grid blackout, partitioning the power grid into subsystems, and respectively performing black-start on the subsystems, according to a black-start research scheme.

According to the power grid black-start research scheme, the power grid is divided into 4 black-start subsystems including central north Hunan, northwest Hunan, southwest Hunan, and south Hunan, where each subsystem has a respective black-start power source, a black-start path, a power source, and a load restoring order and quantity. The northwest Hunan subsystem has two external black-start power sources, that is, a 500 kV Ge-Gan line and a 500 kV Jiang-Fu line from the external power grid, which are external support for black-start of the northwest Hunan subsystem. Other 3 subsystems only have internal black-start power sources, and do not have any external black-start power source.

Contact lines between the 4 subsystems at the level of 500 kV are respectively: a Gang-Ai line, a Fu-Ai line and a Fu-Sha line between the central north Hunan and the northwest Hunan; a Gu-Chuan line between the central north Hunan and the south Hunan; a Min-He line between the central north Hunan and the southwest Hunan; a Wu-Min line between the southwest Hunan and the northwest Hunan; a Chang-Chuan line, a Chang-Zong line and a Yan-Zone line between the southwest Hunan and the south Human; and there is no 500 kV contact lines between the northwest Human and the south Human. The above 9 lines are possible parallel paths between black-start subsystems of the power grid. Moreover, the 500 kV Ge-Ganline and the 500 kV Jiang-Fu line from the external power grid are parallel lines between the power grid and the external power grid, and there are 11 possible parallel paths in total.

Step B: Performing stability check on each subsystem having restoration to more than 30% of a normal load by using power system simulation software, so as to obtain a stable level of each subsystem.

4 subsystems of the central north Hunan, the northwest Hunan, the southwest Hunan, and the south Hunan being independent from one another, restoring a single circuit line of a 500 kV power grid in each subsystem (for a double circuit line or a multiple circuit line, restoring of an I line thereof is described as an example, and the line in this text refers to I line, unless specified), and a subsystem operation manner in which each subsystem is started according to the black-start research scheme to restore the load to the level of 30% are used as parallelization initial states of the 4 subsystems.

Based on the parallelization initial states of the 4 subsystems of the central north Hunan, the northwest Hunan, the southwest Hunan, and the south Hunan, the frequency stability, the voltage stability and the power angle stability of the system when failure-free breakdown and a single-phase permanent grounding short circuit failure of a line in a voltage level of 110 kV and more occur in the 4 subsystems are respectively simulated and checked.

A result of subsystem stability check is as follows: for the 3 subsystems of the central north Hunan, the northwest Hunan and the southwest Hunan, the subsystems can maintain stable operation when failure-free breakdown and a single-phase permanent grounding short circuit failure of a line in a voltage level of 110 kV and more occur, where the northwest Hunan subsystem has a relatively high stability level and the strongest ability against failure, and followed by the central north Hunan subsystem and the southwest Hunan subsystem. The subsystem voltage cannot be maintained when a single-phase permanent grounding short circuit failure occurs at a Zi side of a Zong-Zi line of the South Human subsystem, and the subsystem can maintain stable operation in other failures.

Step C: Continuously restoring load for an unstable subsystem, and performing stability check once when every 5% of normal load is increased, so as to obtain stable levels of the subsystems, until the subsystems are all stable.

For the south Hunan subsystem, the power source is started continuously, the line and load are restored, and the stability check is conducted once when every 5% of normal load is increased. When 40% of the normal load level is restored, the stability check result indicates that the South Human subsystem can maintain stable operation.

Step D: Performing voltage calculation on parallel lines between the subsystems by using power system simulation software, primarily determining unavailable parallel paths so as to obtain primary available parallel paths, and selecting a charging direction having a lower terminal charging voltage as a charging direction.

For various parallel lines clarified in step A, line voltage changes when being changed from two sides are calculated respectively, so as to determine a recommended charging direction accordingly. A control requirement for an initial voltage before charging is proposed for some situations in which the voltage after charging exceeds 1.1 times of a rated voltage. Voltage calculation results of some parallel lines at the 500 kV voltage level between the subsystems of the power grid are shown in the following table, where a voltage unit is kV, a bold printed row represents the recommended charging direction, and the note indicates a voltage control measure.

1. The northwest Hunan and the central north Hunan subsystems are parallelized through a Fu-Ai I line

| Bus name | Fuxing | Aijiachong | Note |
| --- | --- | --- | --- |
| Voltage before parallelization | 528.49 | 529.94 | |
| Charging from Fu to Ai | 546.93 | 548.29 | |
| Charging from Ai to Fu | 540.69 | 539.35 | |

2. The southwest Hunan and the south Hunan subsystems are parallelized through the Chang-Chuan line

| Bus name | Changyangpu | Chuanshan | Note |
| --- | --- | --- | --- |
| Voltage before parallelization | 533.99 | 526.64 | |
| Charging from Chang to Chuan | 541.3 | 545.65 | Changyangpu side has high resistance |
| Charging from Chuan to Chang | 531.50 | 533.99 | |

3. The southwest Hunan and the south Hunan subsystems are parallelized through the Chang-Zong line

| Bus name | Changyangpu | Zongyuan | Note |
| --- | --- | --- | --- |
| Voltage before parallelization | 533.99 | 526.48 | |
| Charging from Chang to Zong | 562.05 | 565.28 | An initial voltage of Changyangpu is controlled to be 514.01, and after charging from Chang to Zong, the voltage of Changyangpu is 538.46, and the voltage at the Zongyuan side is 541.55. |
| Charging from Zong to Chang | 563.57 | 560.34 | When the voltage of Zongyuan is 514.71, after charging from Zong to Chang, the voltage of Zongyuan is 544.11, and the voltage at the Changyangpu side is 547.24; |

4. The southwest Hunan and the south Hunan subsystems are parallelized through the Yan-Zong line

| Bus name | Yanshanhong | Zongyuan | Note |
| --- | --- | --- | --- |
| Voltage before parallelization | 539.923 | 526.48 | |
| Charging from Yan to Zong | 547.50 | 549.28 | Yanshanghong and Zongyuan both have high resistance |
| Charging from Zong to Yan | 535.16 | 533.42 | |

5. The power grid and an external grid are parallelized through the Ge-Gang line

| Bus name | Gehuan | Gangshi | Note |
|---|---|---|---|
| Voltage before parallelization | 540.07 | 532.29 | |
| Charging from Ge to Gang | 528.92 | 542.88 | The Ge side has high |
| Charging from Gang to Ge | 540.66 | 545.36 | resistance |

6. The power grid and an external grid are parallelized through the Jiang-Fu line

| Bus name | Jiangling | Fuxing | Note |
|---|---|---|---|
| Voltage before parallelization | 541.38 | 528.49 | |
| Charging from Jiang to Fu | 541.37 | 543.86 | The voltage of Jiangling is controlled to be not exceeding 535, and during charging from Jiang to Fu, the voltage of Jiangling is 541, and the voltage at the Fuxing side is 544. |
| Charging from Fu to Jiang | 630.25 | 635.52 | |

Calculation results indicate that, even if the initial voltage is controlled to be very low, regardless of the charging direction, the charging voltage of the Chang-Zong line between the southwest Hunan subsystem and the south Hunan subsystem exceeds 1.1 times of the rated voltage, and therefore, the line is not an available parallel line, and parallelization of the southwest Hunan subsystem and the south Hunan subsystem may be avoided from being implemented through the Chang-Zong line. For other 10 parallel lines, voltage levels can meet the requirement if the initial voltage is control when necessary and parallelization is conducted according to a designated charging direction.

Step E: Performing parallel simulation check on the primary available parallel paths in step D by using power system simulation software, and further determining unavailable parallel paths so as to obtain available parallel paths.

For the 10 primary available parallel lines obtained in step D, subsystem parallel transient simulation calculation is conducted according to the charging direction determined in step D, and the power fluctuation on the parallel line during the subsystem parallelization, unit relative power angles of the parallelized subsystems, the bus voltage of 500 kV transformers, and changes of system frequency are checked.

A result of the power grid subsystem parallel simulation check is that: during the subsystem parallelization, the power fluctuation of the parallel line is small, and the parallelization has small influences on the unit relative power angle, the transformer bus voltage and the system frequency; therefore, conducting subsystem parallelization according to the charging direction determined in step D is available.

Step F: Parallelizing black-start subsystems of the power grid with external support according to the following sequence:

F1. Networking a subsystem having an external support and having a relatively high stability level with an external power grid;

F2. Networking a subsystem having an external support and having a relatively low stability level with the external power grid;

F3. Parallelizing the networked subsystems having external support, so as to obtain a subnet of the subsystems having external support;

F4. Parallelizing a subsystem having no external support and having a relatively high stability level with the subnet of the subsystems having external support, so as to obtain a regional subnet;

F5. Parallelizing a subsystem having no external support and having a relatively low stability level with the regional subnet, so as to obtain a large regional subnet;

F6. Parallelizing the remaining subsystems with the large regional subnet, so as to implement parallelization of black-start subsystems of the whole power grid; and F7. In each of the above networking and parallelizing steps, if there exist multiple available paths between two subsystems, perform the corresponding step according to a sequence of overvoltage levels from low to high.

Subsystem parallelization with external support is conducted according to the subsystem stability check result determined in step C, the available parallel line and charging direction determined in step D and the subsystem parallel simulation check result determined in step E.

In the power grid, only the northwest Hunan subsystem has external support, first, networking of the northwest Hunan subsystem with the external power grid is implemented, there are two parallel paths available, namely, the Ge-Gang line and the Jiang-Fu line, and according to the voltage calculation result, the Ge-Gang line is selected preferentially to implement the networking, thereby determining that the first step is networking the northwest Hunan subsystem with the external power grid through the Ge-Gang line (charging from Ge to Gang), and the second step is networking the northwest Hunan subsystem with the external power grid through the Jiang-Fu line (charging from Jiang to Fu). In the power grid, other subsystems do not have any external black-start power source support, and therefore, the northwest Hunan subsystem is a regional power grid formed by parallelizing all subsystems with external support in the power grid.

The northwest Hunan subsystem is parallelized with the adjacent Central North Hunan subsystem having not external support and having relatively high stability level, that is, it is determined that the third step is parallelizing the northwest Hunan subsystem with the Central North Hunan subsystem through the Fu-Ai line (charging from Ai to Fu), and then it is parallelized with the southwest Hunan subsystem having a second high stability value, that is, it is determined that the fourth step is parallelizing the northwest Hunan subsystem with the southwest Hunan subsystem through the Wu-Min line (charging from Wu to Min). So far, based on the northwest Hunan subsystem, parallelization with the Central North Hunan subsystem and parallelization with the northwest Hunan subsystem are implemented respectively. To further stabilize the regional power grid formed by parallelizing subsystems, it is determined that the fifth step is parallelizing the Central North Hunan subsystem with the southwest Hunan subsystem through the Min-He line (charging from He to Min). Then, the regional power grid formed by parallelized subsystems is parallelized with the south Hunan subsystem, there are two available parallel paths, namely, the Gu-Chuan line and the Yan-Zong line, and preferably, the parallelization with the south Hunan subsystem is implemented from the Central North Hunan subsystem having high stability level, that is, it is determined that the sixth step is parallelizing the south Hunan subsystem with the Central North Hunan subsystem through the Gu-Chuan line (charging from Gu to Chuan), and therefore, the overall main network structure of the power grid is formed. Moreover, there is an available parallel line, Yan-Zong line, between the southwest Hunan subsystem and the south Hunan subsystem not being networked, and it is determined that the seventh step is networking the southwest Hunan subsystem with the south Hunan subsystem through the Yan-Zong line (charging from Zong to Yan), so as to enhance the main network structure.

In view of the above, the parallelization scheme for black-start subsystems of the power grid with external support is:

First step: networking the northwest Hunan subsystem with the external power grid through the Ge-Gang line (charging from Ge to Gang)

Second step: networking the northwest Hunan subsystem with the external power grid through the Jiang-Fu line (charging from Jiang to Fu)

Third step: parallelizing the northwest Hunan subsystem with the Central North Hunan subsystem through the Fu-Ai line (charging from Ai to Fu)

Fourth step: parallelizing the northwest Hunan subsystem with the southwest Hunan subsystem through the Wu-Min line (charging from Wu to Min)

Fifth step: parallelizing the southwest Hunan subsystem with the Central North Hunan subsystem through the Gu-Chuan line (charging from Gu to Chuan)

The method of the present invention is not limited to the specific power grid, is not limited to the quantity of the subsystems, the quantity of possible parallel paths between subsystems, and is also not limited to the voltage level of the parallel line and the used simulation software, and they can all be applied in the method provided in the present invention.

Related method steps and data described in the text are merely specific embodiments of the patent of the present invention, and are overall description and exemplary illustration on the patent spirit of the present invention. Persons skilled in the art of the patent of the present invention can further know various possibilities of variable or optional embodiments, and can make various modifications, supplementations, improvements or similar replacements under derivation of the spirit and principle of the present invention. For example, operation overvoltage calculation is supplemented in step D or step E, or only the power angle stability and the voltage stability are calculated and checked in step B or step E without calculating and checking the frequency stability, or a failure type of the simulation check is changed in step B. It should be understood that these modifications, supplementations, improvements or replacements are considered to be incorporated in the present invention, instead of departing from the spirit of the patent of the present invention or exceeding the scope defined by the accompanying claims.

The foregoing description of the exemplary embodiments of the present invention has been presented only for the purposes of illustration and description and is not intended to be exhaustive or to limit the present invention to the precise forms disclosed. Many modifications and variations are possible in light of the above teaching.

The embodiments are chosen and described in order to explain the principles of the present invention and their practical application so as to enable others skilled in the art to utilize the present invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A parallelization method for black-start subsystems of a power grid with external support, comprising the steps of:
   (A) after the power grid blackout, partitioning the power grid into subsystems, and respectively performing black-start on the subsystems, according to a black-start research scheme;
   (B) performing stability check on each subsystem having restoration to more than 30% of a normal load by using power system simulation software, so as to obtain a stable level of each subsystem;
   (C) continuously restoring load for an unstable subsystem, and performing stability check once when every 5% of the normal load is increased, so as to obtain stable levels of the subsystems, until the subsystems are all stable;
   (D) performing voltage calculation on parallel lines between the subsystems by using power system simulation software, primarily determining unavailable parallel paths so as to obtain primary available parallel paths, and selecting a charging direction having a lower terminal charging voltage as a charging direction;
   (E) performing parallel simulation check on the primary available parallel paths obtained in step (D) by using power system simulation software, and further determining unavailable parallel paths so as to obtain available parallel paths; and
   (F) parallelizing black-start subsystems of the power grid with external support according to the following sequence:
      (F1) networking a subsystem having an external support and a relatively high stability level with an external power grid;
      (F2) networking a subsystem having an external support and a relatively low stability level with the external power grid;
      (F3) parallelizing the networked subsystems having external support, so as to obtain a subnet of the subsystems having external support;
      (F4) parallelizing a subsystem having no external support and a relatively high stability level with the subnet of the subsystems having external support, so as to obtain a regional subnet;
      (F5) parallelizing a subsystem having no external support and having a relatively low stability level with the regional subnet, so as to obtain a large regional subnet;
      (F6) parallelizing the remaining subsystems with the large regional subnet, so as to implement parallelization of black-start subsystems of the whole power grid; and
      (F7) in each of the above networking and parallelizing steps, if there exist multiple available paths between two subsystems, performing the corresponding step according to a sequence of overvoltage levels from low to high.

2. The parallelization method according to claim 1, wherein the power system simulation software used in steps (B), (D) and (E) is PSASP, BPA, DSA or PSS/E.

* * * * *